Feb. 23, 1971  G. G. TERTIPIS ET AL  3,565,808
PROCESSES FOR OBTAINING HIGH YIELDS OF CARBON FROM PETROLEUM
RESIDUUMS AND FOR THE MANUFACTURE OF HIGH
CARBON CONTENT AGGREGATES
Filed Nov. 24, 1967  2 Sheets-Sheet 1

United States Patent Office 3,565,808
Patented Feb. 23, 1971

3,565,808
PROCESSES FOR OBTAINING HIGH YIELDS OF CARBON FROM PETROLEUM RESIDUUMS AND FOR THE MANUFACTURE OF HIGH CARBON CONTENT AGGREGATES
George G. Tertipis, Rexdale, Ontario, John G. Currie, Oakville, Ontario, and Edward T. Hignell, Clarkson, Ontario, Canada, assignor to Gulf Oil Canada Limited, Toronto, Ontario, Canada
Filed Nov. 24, 1967, Ser. No. 685,393
Int. Cl. C01b 31/32
U.S. Cl. 252—188.3
11 Claims

ABSTRACT OF THE DISCLOSURE

A process for obtaining carbon in high yield from a petroleum residuum, in particular from asphalt, which consists of heating the petroleum residuum in a nonoxidizing atmosphere such as nitrogen at a temperature exceeding 1000° F. and a pressure exceeding 50 p.s.i.a.

---

This invention relates to processes for obtaining high yields of carbon from petroleum residuums. This invention also relates to the manufacture of high carbon content aggregates whose properties render them valuable as feedstocks for, or reducing agents in the ferrous or nonferrous metal industry, as well as in the chemical industry. In this respect, and by way of a specific example, this invention relates to the manufacture of calcium carbide.

Calcium carbide commonly is made from calcium oxide and coal in an electric furnace, the coal serving as a source of the required carbon.

Petroleum residuums or refinery bottoms such as asphalt also are sources of carbon (asphalts generally contain about 85% carbon), but, to our knowledge, no commercially practicable process competitive with coal is practised for the manufacture of calcium carbide feedstock using asphalt in place of coal. In accordance with one aspect of this invention, we have discovered a process for the production of calcium carbide feedstock which utilizes asphalt in place of coal and which is commercially attractive.

In accordance with another aspect of this invention, we have discovered processes which enable carbon to be obtained from petroleum residuums, such as asphalt, in higher yields (60% or more) than has hitherto been possible insofar as we are aware.

While it is appreciated that it probably would be possible, although perhaps not economically practical, to produce calcium carbide using calcium oxide and petroleum coke, the latter having been manufactured in a conventional manner by the separate pyrolysis of asphalt in a process carried out prior to the production of a calcium carbide feedstock containing calcium oxide and petroleum coke, such a process would be wasteful of energy in that heat is required to reduce calcium carbonate to calcium oxide, and additional heat is required to make petroleum coke. In accordance with this invention, energy is conserved in that at least some and preferably all of the heat necessary to obtain the required carbon from asphalt is derived from the heated calcium oxide as it emerges from the calcining kiln.

Whereas it is necessary in the production of calcium carbide from coal and calcium oxide that these components be physically mixed with each other prior to introduction into the electric furnace, there is no need for an actual physical mixing step in a process embodying this invention, since an intimate admixture of calcium oxide and carbon is produced directly as a result of the nature of the process.

Figure 1:
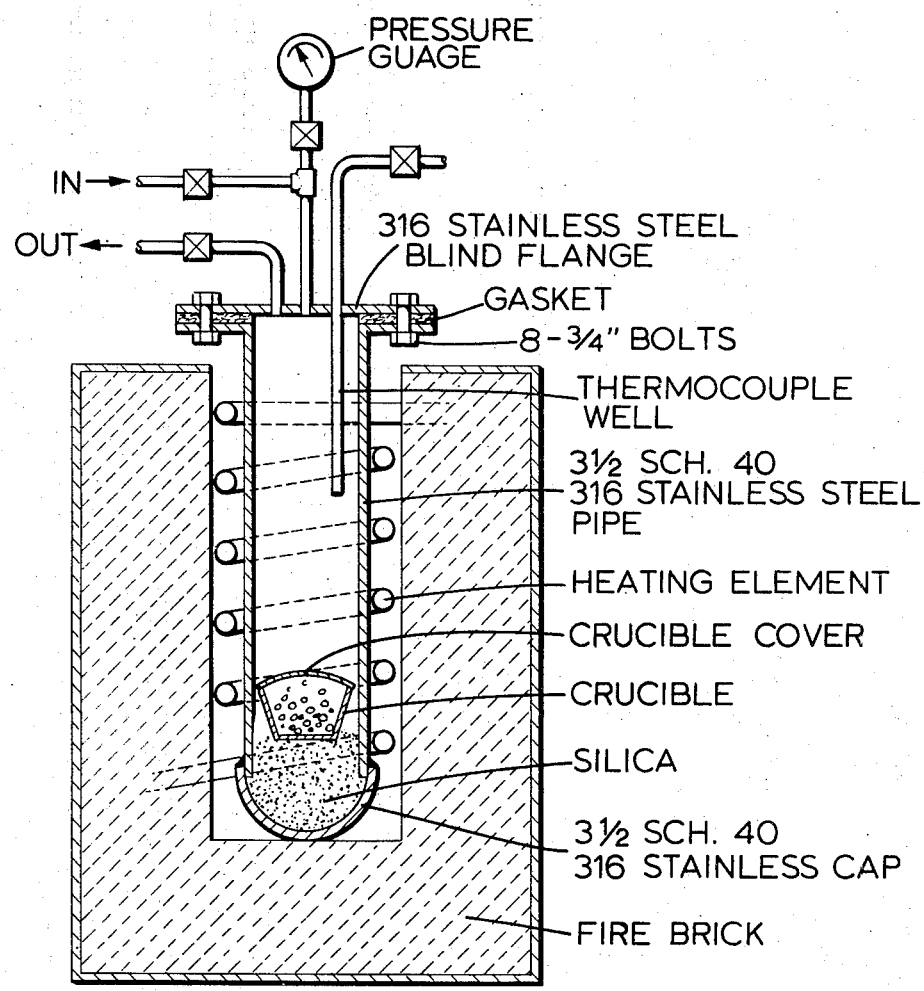
Figure 2:
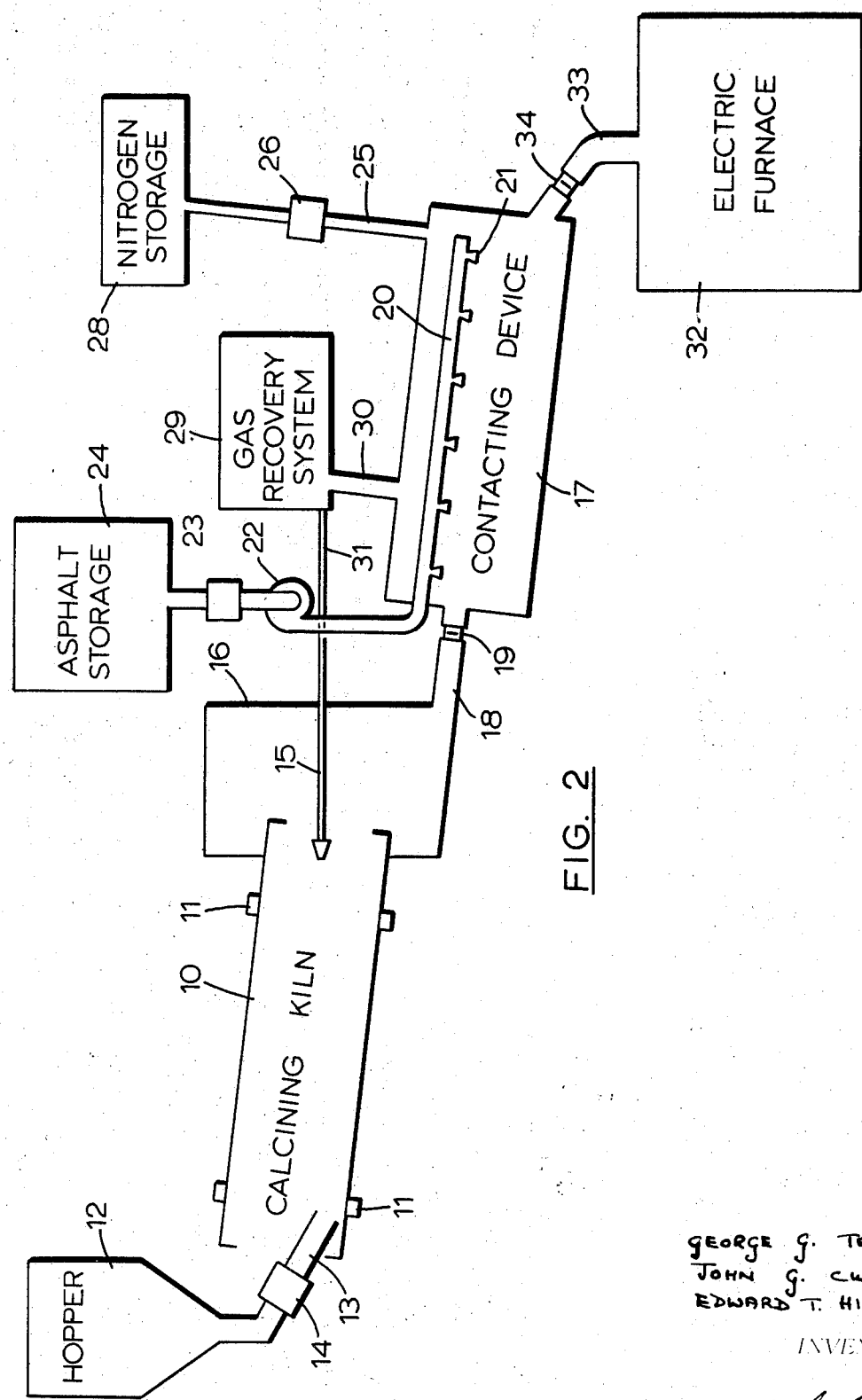

This invention will become more apparent from the following description, taken in conjunction with the appended drawings, in which:

FIG. 1 is a sectional view through laboratory equipment which may be used for producing a calcium carbide feedstock, and FIG. 2 is a schematic representation of commercial equipment which may be used in the practice of this invention.

In accordance with one aspect of this invention, it has been discovered that if petroleum residuums, such as asphalt are mixed with calcium oxide and are heated under pressures in excess of atmospheric pressure and at elevated temperatures in a nonoxidizing atmosphere, a calcium carbide feedstock can be produced economically. It has been discovered that when calcium oxide is saturated with liquefied asphalt and heated under pressure and at elevated temperatures in a nonoxidizing atmosphere, the asphalt becomes coked in the pores of and upon the calcium oxide, thus forming an intimately combined aggregate of calcium oxide and carbonized asphalt which can be used in the production of calcium carbide.

In accordance with another aspect of this invention, it has been discovered that if petroleum residuums, such as asphalt, are heated under pressures in excess of atmospheric pressure, say 50 p.s.i.a. to 150 p.s.i.a., and at elevated temperatures in excess of 1000° F. in a nonoxidizing atmosphere, carbon yields in excess of 60% can be obtained.

A wide variety of petroleum residuums may be used in the practice of this invention. Obviously, the petroleum residuum should have as high a carbon content as possible and preferably a low sulphur content. The process of this invention can use an asphalt which is high in volatiles as represented by its Ramsbottom Carbon Residue (ASTM D524). Of course, it will be appreciated that the use of an asphalt which is low in volatiles would be more advantageous from an economic point of view with respect to the recovery of the carbon available in the asphalt.

In the practice of the invention, pressures substantially in excess of atmospheric pressure should be employed. In this respect, pressures in excess of 50 p.s.i.a. up to 150 p.s.i.a., for example, have been found to be completely satisfactory.

In the practice of this invention, it is desirable that temperatures in excess of 1000° F. be employed. Suitable results have been obtained with temperatures in the range of 1000 to 1600° F., although higher temperatures may be used.

In order to minimize the loss of carbon in the form of carbon monoxide, for example, the process should be carried out in a nonoxidizing asmosphere.

The amount of carbon which must be laid down on the calcium oxide from the asphalt in order to make the process commercially competitive with the prior art process in which coal is employed is dependent upon many factors, not the least of which is the cost to the calcium carbide manufacturer of the coal and asphalt respectively. In general, however, it will be found in most instances that a process in which about 75–80% of the carbon in the asphalt is recovered would be competitive with a process using coal. It will be appreciated, of course, that in some cases more carbon may have to be recovered from the asphalt to achieve this objective, while in other cases the recovery of less carbon from the asphalt still would result in a commercially attractive process.

EXAMPLE 1

In order to demonstrate the recovery of carbon from asphalt, a weighed sample of Weyburn-Midale asphalt was placed in a weighed porcelain crucible and was introduced into a steel autoclave of approximately 1600 cc. capacity, the bottom of which was covered by sand.

The autoclave was assembled and placed in a furnace of the type shown in FIG. 1. The air in the autoclave was replaced with dry oxygen-free nitrogen of approximately 50 p.s.i.g. pressure by alternately introducing nitrogen and then evacuating the autoclave with a vacuum pump. Finally, nitrogen was introduced and its pressure was adjusted to that shown in Table 1. The system then was heated to approximately 1500° F., at which temperature heating was continued for 20 minutes. The system was allowed to cool to room temperature, and the carbon deposited on the crucible and said was determined. The carbon which in all the examples was observed to deposit on the interior of the autoclave was not determined. Results are listed in Table 1.

Analytical data on the Weyburn-Midale asphalt used is given in Table 2. The calcium oxide used was of the ≤½ inch.

The elemental carbon thus produced was intermixed with the calcium oxide and formed a coating on the oxide. This form is the most desirable in metallurgical reductions. The calcium oxide-elemental carbon aggregate could be used without further treatment as a feedstock in a reduction furnace for the manufacture of calcim carbide. Results are listed in Table 3.

EXAMPLE 4

A calcim oxide-liquefied asphalt mixture was heated as in Example 3, except that nitrogen at 18.7 p.s.i.a. pressure was used. The composition of the gases based on an air- and water-free basis was as follows (in vol. percent): hydrogen 26.00, nitrogen 53.70, carbon monoxide 13.80, carbon dioxide 0.20, hydrogen sulphide 0.05, methane 6.20 and benzene 0.20. This gaseous mixture TABLE 1.—CARBONIZATION OF WEYBURN-MIDALE ASPHALT UNDER PRESSURE (NITROGEN ATMOSPHERE)

| Ex. No. | Carbonization temperature, ° F. | Pressure of $N_2$ in the autoclave prior to carbonization, p.s.i.a. | Pressure of gases at end of the carbonization, p.s.i.a. | Ashphalt carbon deposited in crucible, percent w./w. | Asphalt carbon deposited on sand, percent w./w. | Total asphalt carbon recovered percent w./w. | Asphalt carbon converted to gases, percent w./w. |
|---|---|---|---|---|---|---|---|
| 1 | 1,500 | 16.7 | 62.7 | 38 | 34 | *72 | |
| 2 | 1,500 | 24.7 | 77.7 | 49 | 22 | *71 | 6 |

*Carbon deposited on the interior of the autoclave and that converted to gases during the carbonization are not included.

TABLE 2

Analytical data on Weyburn-Midale asphalt

Visc. Kin. 250° F.—867
Visc. Kin. 275° F.—345
Visc. Kin. 300° F.—206
Pen. 77° F. 10 gm. 5 sec.—34
Carbon—85.5 wt. percent
Hydrogen—10:0 wt. percent
Sulphur—4.5 wt. percent
Ramsbottom Carbon Residue (ASTM D-524-62)—23.5 wt. percent
Carbon in Ramsbotton Carbon Residue—93.3 wt. percent

EXAMPLE 2

The process as outlined in Example 1 was repeated, but after the twenty-minute heating period at 1500° F., the carbonization gases were sampled with a Hoke stainless steel bomb and, when cool, were analyzed. The composition was (in vol. percent) hydrogen 18.40, nitrogen 68.00, carbon monoxide 6.30, carbon dioxide 0.30, methane 4.80, benzene traces, water 0.10 and air 2.10. Results are listed in Table 1.

EXAMPLE 3

In order to demonstrate the production of a calcium carbide feedstock, a weighed sample of liquefied Weyburn-Midale asphalt was mixed with an equal amount of calcium oxide in a weighed porcelain crucible and then heated as in Example 1. Nitrogen of 14.7 p.s.i.a. pressure was introduced in the autoclave prior to heating.

could be used directly or further treated to pyrolyze the methane to obtain a new gaseous mixture comprised of nitrogen, hydrogen and carbon monoxide. Results are listed in Table 3.

EXAMPLE 5

A calcium oxide-liquefied asphalt mixture was treated as in Example 3, except that nitrogen at 24.7 p.s.i.a. pressure was used. Results are listed in Table 3.

A calcium oxide-liquefied asphalt mixture was heated as in Example 3, except that nitrogen at 34.7 p.s.i.a. pressure was used and the calcium oxide to asphalt ratio was 1.0:2.6. In this example, part of the gases was released to the air at 1000° F. (approximately 105.7 p.s.i.a. pressure) and the carbonization was terminated at approximately 1300° F. because of the high pressure of the gases which would develop at 1500° F. Results are listed in Table 3.

EXAMPLE 7

A calcium oxide-liquefied asphalt mixture was heated as in Example 3, except that nitrogen at 16.7 p.s.i.a. pressure and nickel crucible were used. The elemental carbon deposited on the wall of the crucible was found to be carbon black. The composition of the gases based on an air- and water-free basis was as follows (in vol. percent): hydrogen 33.10, nitrogen 48.70, carbon monoxide 15.50, carbon dioxide 0.20, hydrogen sulphide 0.10, methane 2.40 and benzene 0.03. Results are listed in Table 3.

TABLE 3.—CARBONIZATION OF CALCIUM OXIDE-ASPHALT (WEYBURN-MIDALE) MIXTURE UNDER PRESSURE (NITROGEN ATMOSPHERE)

| | Carbonization temperature, ° F. | Pressure of $N_2$ in the autoclave prior to carbonization p.s.i.a. | Pressure of gases at the end of the carbonization p.s.i.a. | Asphalt carbon deposited on CaO, percent w./w. | Asphalt carbon deposited on sand, percent w./w. | Total asphalt carbon recovered, percent w./w. | Asphalt carbon in carbonization gases percent w./w. | Asphalt carbon not accounted percent w./w. | CaO to asphalt ratio |
|---|---|---|---|---|---|---|---|---|---|
| Example No.: | | | | | | | | | |
| 3 | 1,520 | 14.7 | 65.7 | 40.0 | 35.0 | 75.0 | 6.2 | ¹18.8 | 4.0/4.2 |
| 4 | 1,525 | 18.7 | 109.7 | 45.0 | 31.0 | 76.0 | 14.0 | ¹10.0 | 5.3/5.4 |
| 5 | 1,490 | 24.7 | 146.7 | 37.0 | 27.0 | 64.0 | 25.5 | ¹10.5 | 4.0/4.1 |
| 6 | 1,300 | 34.7 | (²) | ²42.0 | ²20.0 | ²62.0 | | | 1.0/2.6 |
| 7 | 1,500 | 16.7 | 114.7 | 45.0 | 30.5 | 75.5 | 17.0 | ¹7.5 | 5.4/4.4 |

¹ It includes the carbon deposited on the interior of the autoclave plus that leaked to the air as gas.
² Part of the carbonization gases were released to the air at 1,000° F.

Turning now to FIG. 2, there is schematically shown apparatus which may be used commercially in the practice of this invention. There is provided a conventional calcining kiln 10 of the horizontal rotary type which is supported on bearings 11 and which is rotated in a conventional manner. Calcium carbonate to be reduced to calcium oxide in calcining kiln 10 is stored in a hopper 12 and is discharged into kiln 10 from a chute 13 communicating with hopper 12 through a valve 14 which meters the flow of calcium carbonate to the calcining kiln.

A plurality of burners 15, only one of which is shown, provide the necessary heat for the reduction of the calcium carbonate to calcium oxide in the calcining kiln. The hot calcium oxide is discharged from kiln 10 into a chamber 16 which communicates with a contacting device 17 by means of a conduit 18 in which there is located a star valve 19 or any other suitable type of device which enables contacting device 17 to remain pressurized.

Disposed within contacting device 17 is a pipe 20 having a plurality of spray nozzles 21 communicating therewith. Pipe 20 is connected via pump 22 and a valve 23 to an asphalt storage tank 24 from which asphalt is pumped into contacting device 17 and sprayed therein by spray nozzles 21 onto the hot calcium oxide introduced into contacting device 17 via conduit 18. It may be necessary to provide heaters in asphalt storage tank 24 to keep the asphalt in sufficiently liquid form that it can be sprayed into contacting device 17.

Communicating with contacting device 17 via a conduit 25 and a valve 26 is a nitrogen storage tank 28 containing nitrogen under pressure.

A gas recovery system 29 is connected via a conduit 30 to contacting device 17, and a part of the gases recovered from contacting device 17 may be supplied to burners 15 via a conduit 31 and burned to effect reduction of the calcium carbonate to calcium oxide.

An electric furnace 32, which may be of conventional design, is provided for the manufacture of calcium carbide. The calcium carbide feedstock from contacting device 17 is supplied therto via a conduit 33 in which is interposed a star valve 34 or other suitable device that permits contacting device 17 to remain under pressure.

In practising this invention, valve 26 is opened, thus admitting nitrogen under pressure into contacting device 17, thereby sweeping out any oxidizing atmosphere which may be present in the contacting device. It will be appreciated that the use of nitrogen is not essential to the invention, and that other nonoxidizing gases may be used in place thereof. The nitrogen need not be introduced at a pressure that is of the order of the final operating pressure in contacting device 17, since gases will be evolved during the process and will cause an increase in the pressure within contacting device 17. The pressure can be regulated by any suitable system such as, for example, a valve in conduit 30.

After the oxidizing atmosphere has been purged from contacting device 17, hot calcium oxide is introduced into the contacting device, and asphalt is sprayed thereon from nozzles 21. The pressure in contacting device 17 preferably is regulated to be of the order of 50 p.s.i.a. or higher. It is likely that the calcium oxide particles will be sufficiently hot when introduced into contacting device 17 that no further heat will have to be added thereto to effect pyrolysis of the asphalt. However, if desirable or necessary, additional heat can be supplied by heating contacting device 17. The calcium carbide feedstock thus produced is introduced into electric furnace 32 via conduit 33. Calcium carbide is made conventionally in electric furnace 32.

It will be found that some gases such as those indicated in Example 4 will be produced in contacting device 17. These may be discharged to gas recovery system 29, and those components of these gases which are combustible may be supplied to burners 15 and used to reduce the calcium carbonate to calcium oxide.

Once the oxidizing atmosphere has been purged from contacting device 17, it may be possible to close valve 26 cutting off the supply of nitrogen to the contacting device. It has been found under some circumstances, however, that the presence of nitrogen seems to have a beneficial effect on the amount of carbon recovered from the asphalt, so it may be desirable to introduce nitrogen into contacting device 17 on a continuous basis.

While the process hereinbefore described with reference to FIG. 2 relates to the production of a calcium carbide feedstock and to the production of calcium carbide, this is only one embodiment of this invention, albeit an important embodiment. A process embodying this invention may find utility in the production and use of high carbon content aggregates as feedstocks for, or reducing agents in various chemical or metallurgical processes. Thus, this invention may be used in the reduction of various ores, e.g., titanium oxide to titanium metal.

While preferred embodiments of this invention have been disclosed herein, those skilled in the art will appreciate that changes and modifications may be made therein without departing from the spirit and scope of this invention as defined in the appended claims.

What we claim as our invention is:

1. A process for manufacturing an aggregate of carbon and calcium oxide which comprises heating a petroleum residuum while admixed with said calcium oxide in a nonoxidizing atmosphere at a temperature of from about 1000° F. to about 1600° F. and a pressure in excess of 50 p.s.i.a.

2. A process according to claim 1 wherein said petroleum residuum is asphalt.

3. A process according to claim 2 wherein said pressure is between 50 and 150 p.s.i.a.

4. A process according to claim 2 wherein said pressure is between 50 and 150 p.s.i.a., and wherein said nonoxidizing atmosphere is a nitrogen atmosphere at the commencement of the heating of said petroleum residuum.

5. A process according to claim 1 wherein said step of heating a petroleum residuum is carried out by:
introducing hot calcium oxide into a chamber containing a nonoxidizing atmosphere at a temperature of from about 1000° F. to about 1600° F. and a pressure in excess of 50 p.s.i.a.,
and introducing said petroleum residuum into said chamber and onto said hot calcium oxide.

6. A process according to claim 5 wherein said petroleum residuum is heated in said chamber to said temperature, at least part of the necessary heat being supplied by said hot calcium oxide.

7. A process according to claim 6 wherein said petroleum residuum is asphalt.

8. A process according to claim 7 wherein said hot calcium oxide is produced by calcining calcium carbonate.

9. A process according to claim 7 including the step of discharging said aggregate into an electric furnace for making calcium carbide.

10. A process according to claim 7 wherein said petroleum residuum is asphalt, and wherein said hot calcium oxide is produced by calcining calcium carbonate, and including the step of discharging said aggregate into an electric furnace for making calcium carbide.

11. A process according to claim 7 wherein all of the heat necessary to heat said petroleum residuum to said temperature is supplied by said hot calcium oxide.

(References on following page)

References Cited

UNITED STATES PATENTS

| | | | |
|---|---|---|---|
| 1,219,797 | 3/1917 | Barnett et al. | 23—208 |
| 2,222,585 | 11/1940 | Riggs | 23—208 |
| 2,414,625 | 1/1947 | Abrams et al. | 252—188.3 |
| 2,956,868 | 10/1960 | Burgess | 252—188.3 |
| 3,012,970 | 12/1961 | Banks et al. | 252—188.3 |
| 3,080,216 | 3/1963 | Sem | 252—188.3 |
| 3,017,259 | 1/1962 | Eastman | 252—188.3 |

RICHARD D. LOVERING, Primary Examiner

I. GLUCK, Assistant Examiner

U.S. Cl. X.R.

23—208, 209.1, 209.4, 314; 208—44, 50